United States Patent [19]

Matsumiya

[11] Patent Number: 5,563,744
[45] Date of Patent: Oct. 8, 1996

[54] VEHICLE REARVIEW MIRROR

[75] Inventor: James A. Matsumiya, Gerrards, England

[73] Assignee: Britax Wingard Limited, Hampshire, England

[21] Appl. No.: 339,932

[22] Filed: Nov. 15, 1994

[30] Foreign Application Priority Data

Nov. 20, 1993 [GB] United Kingdom .................. 9323922

[51] Int. Cl.⁶ .............................. G02B 5/08; G02B 5/10; G02B 7/182; B60R 1/06
[52] U.S. Cl. ........................... 359/855; 359/864; 359/865; 359/866; 359/868; 359/605; 359/607; 359/872; 248/479; 248/486
[58] Field of Search .................... 359/603, 604, 359/605, 607, 840, 850, 854, 855, 862, 863, 864, 865, 868, 872; 248/479, 486

[56] References Cited

U.S. PATENT DOCUMENTS

| | | | |
|---|---|---|---|
| 3,493,295 | 2/1970 | Kobrehel | 359/840 |
| 3,881,811 | 5/1975 | French . | |
| 4,031,772 | 6/1977 | DeCastri | 359/605 |
| 4,283,117 | 8/1981 | Ellis | 359/840 |
| 4,331,382 | 5/1982 | Graff . | |
| 4,486,075 | 12/1984 | Cohen | 359/865 |
| 4,852,986 | 8/1989 | Yu | 359/865 |
| 5,052,792 | 10/1991 | McDonough | 359/868 |

FOREIGN PATENT DOCUMENTS

| | | |
|---|---|---|
| 0292223 | 1/1991 | European Pat. Off. . |
| 2312842 | 9/1974 | Germany . |
| 2607907 | 9/1977 | Germany . |
| 3312320A1 | 10/1984 | Germany . |
| 3502203 | 7/1986 | Germany .................. 359/855 |

Primary Examiner—Ricky D. Shafer
Attorney, Agent, or Firm—Harness, Dickey & Pierce, P.L.C.

[57] ABSTRACT

An exterior mirror assembly for a motor vehicle comprising a housing (11) containing a first mirror carrier (10, 50, 80) having a first substantially plane mirror (12, 58, 82) mounted thereon and a second mirror carrier (16, 52, 82) mounted adjacent to the first mirror carrier (10, 50, 80) for angular movement about an axis (18, 56, 86) parallel to an adjacent edge of the first mirror (12, 58, 82). The second mirror carrier (16, 52, 82) has a plane mirror (24, 66, 98) on a first face and a convex mirror (26, 68, 100) on a second face. When the second mirror carrier (16, 52, 82) in a first orientation, the mirror (24, 66, 82) on the first face forms a substantially continuous reflective surface with the mirror (12, 58, 88) on the first mirror carrier (10, 50, 80) of substantially uniform curvature. When the second mirror carrier (16, 52, 82) is in a second orientation, the convex mirror (26, 68, 100) on the second face forms a substantially continuous reflective surface with the mirror (12, 60, 90) on the first mirror carrier (10, 50, 80) of greater curvature in the region of the second mirror carrier (16, 52, 82) than in the region of the first mirror carrier (10, 50, 80).

5 Claims, 4 Drawing Sheets

VEHICLE REARVIEW MIRROR

FIELD

This invention relates to rearview mirror assemblies for motor vehicles.

One desirable feature of a vehicle rearview mirror assembly is to have as wide a field of view as can be arranged. For this purpose, it has been proposed to make the mirror of such a mirror assembly of convex shape. However, it has been found that the resulting reduction in the size of the perceived image viewed in such a mirror causes dangerous errors in a user's impression of the proximity of following vehicles viewed therein. Consequently, in many countries, regulations require a vehicle rearview mirror assembly either to be a plane mirror or to be a convex mirror of a relatively large radius of curvature, for example, greater than 1.8 m (hereinafter referred to as a "substantially plane mirror"). The result of this is that, particularly in the case of a mirror assembly mounted on the driver's door of a motor vehicle, there is a so-called "blind spot" between the disappearance of an overtaking vehicle from the field of view of the mirror assembly and its appearance at the periphery of the driver's direct-vision field of view. This problem is enhanced when the overtaking and overtaken vehicles are on converging paths, for example when the overtaken vehicle is joining a motorway.

RELATED ART

It has already been proposed, for example, in US-A-4331382, to alleviate this problem by providing an exterior mirror assembly having a flat portion of sufficient dimensions to meet legal requirements, together an outer convex portion to cover the above mentioned "blind spot". This has the disadvantage of increasing the extent to which the mirror assembly projects from the side of the vehicle. It has also been proposed, in EP-A-0292223 to provide a mirror assembly having a mirror carrier mounted in a housing for angular movement through 180° about a central vertical axis. A plane (or only slightly convex) reflective mirror is mounted on one side of the mirror carrier, while a mirror having a convex outer edge is mounted on the other side. Angular movement of the mirror carrier to bring the latter reflective surface into the user's field of view provides an extended field of vision to cover the "blind spot". However, this mirror assembly suffers from the disadvantage that no view of following traffic is provided during the time when the mirror carrier is being moved from one orientation to the other.

SUMMARY OF THE INVENTION

According to the invention, an exterior mirror assembly for a motor vehicle comprises a housing containing a first mirror carrier having a first substantially plane mirror mounted thereon and a second mirror carrier mounted adjacent to the first mirror carrier for angular movement about an axis parallel to an adjacent edge of the first mirror, the second mirror carrier having a substantially plane mirror on a first face and a convex mirror of greater curvature than the substantially plane mirror on a second face so that, with the second mirror carrier in a first orientation, the mirror on the first face forms a substantially continuous reflective surface with the mirror on the first mirror carrier of substantially uniform curvature and, when the second mirror carrier is in a second orientation, the convex mirror on the second face forms a substantially continuous reflective surface with the mirror on the first mirror carrier of greater curvature in the region of the second mirror carrier than in the region of the first mirror carrier.

In one form of the invention, the first mirror carrier is also pivotally mounted for angular movement about an axis parallel to that of the second mirror carrier and has a second mirror on another face of radius of curvature greater than that of the mirror on its first face.

In a preferred form of the invention, at least one of the mirror carriers has a pivot unit comprising a static shaft having a first segment of greater radius than a second segment, the mirror carrier having a cylindrical bore of radius such as to be a sliding fit on the first segment, together with a radially inwardly extending projection having an inner end positioned to be a sliding fit on the second segment. The inwardly extending projection thus limits angular movement of the mirror carrier to a range determined by the angular extent of the second segment.

DETAILED DESCRIPTION OF THE PREFERRED EMBODIMENT

Figure 1:
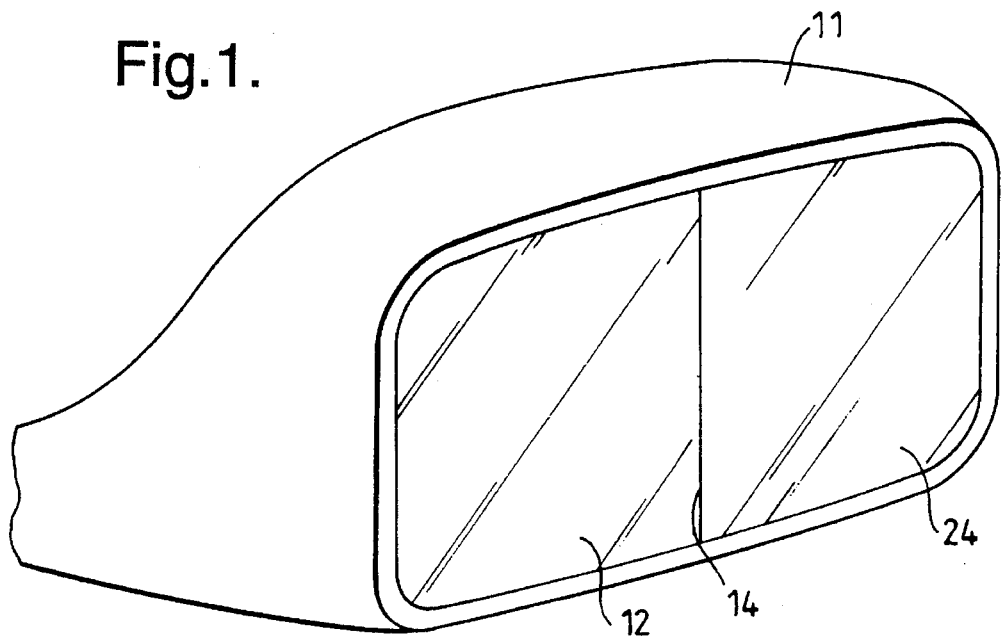
FIG. 1 is a perspective view of a first embodiment of the invention with its mirror carriers oriented to provide a substantially plane mirror of maximum size.
Figure 2:
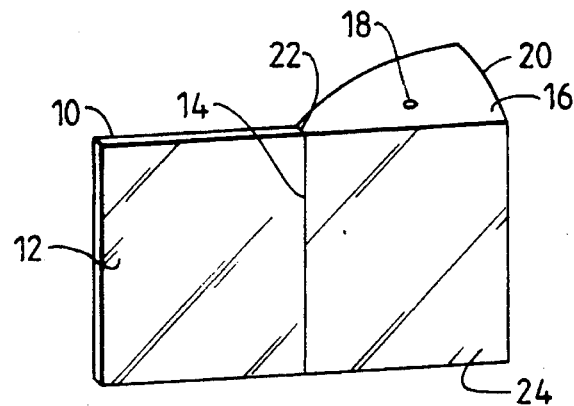
FIG. 2 is a perspective view of the mirror carriers shown in FIG. 1, removed from the housing.

Referring to FIGS. 1 and 2, a mirror carrier 10 is fixedly mounted in a housing 11 so that a substantially plane mirror 12 thereon is visible to a user. The mirror 12 has a straight right-hand edge 14.

Figure 3:
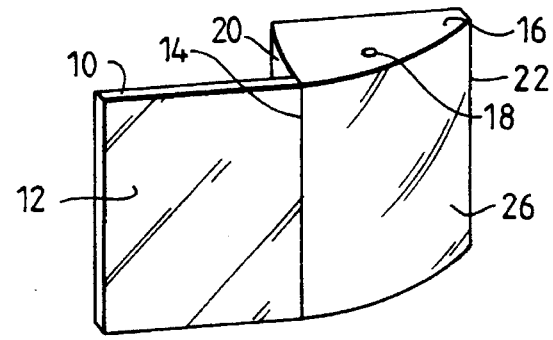
FIG. 3 is a perspective view similar to FIG. 1 but showing one of the mirror carriers oriented to provide a mirror with a region of increased curvature.

A second mirror carrier 16 is mounted for angular movement about a shaft 18 extending substantially parallel to the edge 14. The mirror carrier 16 is generally wedge shaped, having part cylindrical end surfaces 20 and 22 centered on the axis of the shaft 18. The mirror carrier 16 also has a side face carrying a substantially plane mirror 24 and a second side face containing a cylindrical convex mirror 26. When the mirror carrier 16 is in the orientation shown in FIG. 2, the mirror 24 and the mirror 12 on the first mirror carrier 10 together form a substantially plane overall reflective surface. On the other hand, when the mirror carrier 16 is pivoted to the orientation shown in FIG. 3, the two adjacent mirrors 12 and 26 form a combined reflective surface which is substantially plane at its left hand end but has progressively increasing curvature towards its right hand end.

Figure 4:
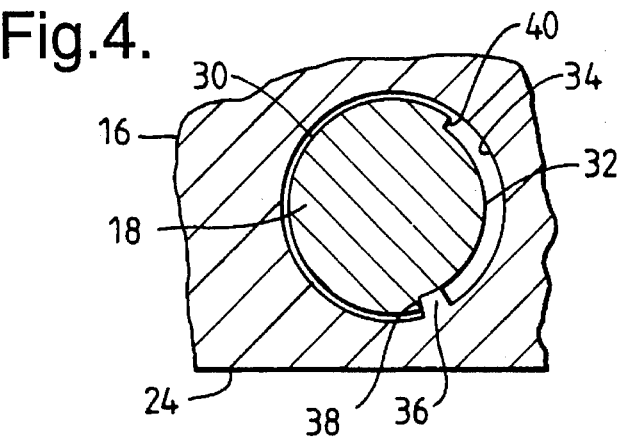
FIG. 4 is a cross-sectional view showing the pivot assembly of one of the mirror carriers in the orientation shown in FIGS. 1 and 2.
Figure 5:
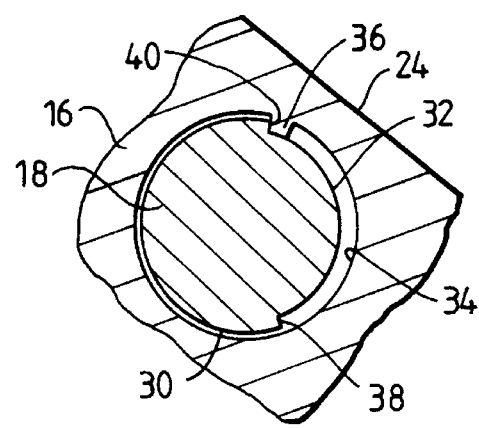
FIG. 5 is a cross-sectional view similar to FIG. 4, but with the mirror carrier in the orientation shown in FIG. 3.
Figure 6:
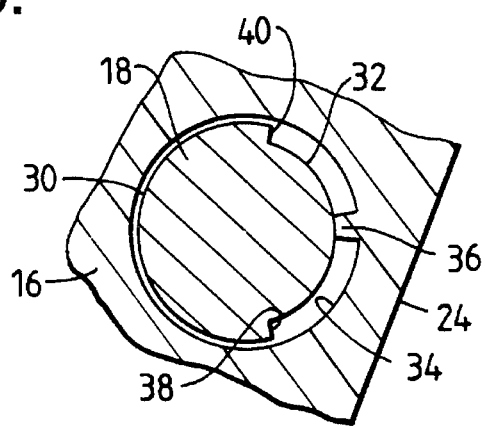
FIG. 6 is a cross-sectional view similar to FIGS. 4 and 5, but showing the mirror carrier in an intermediate orientation.
Figure 7:
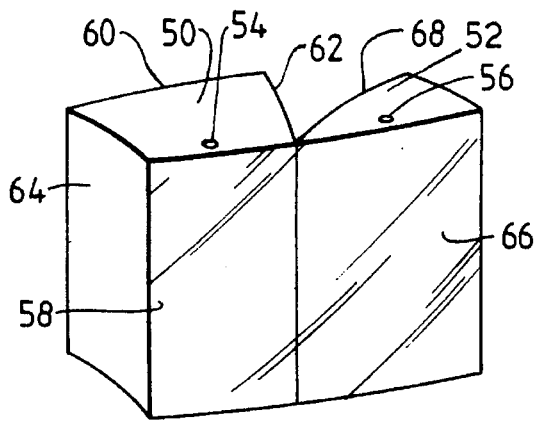
FIG. 7 is a perspective view of a second embodiment of the invention, in which both mirror carriers are mounted for angular movement, and are oriented to provide a substantially plane mirror.

Referring to FIG. 4, the shaft 18 has a segment 30 of a first radius extending over more than 180°, and a second segment 32 of a smaller radius extending over the rest of its periphery. The shaft 18 projects through a bore 34 in the mirror carrier 16, the diameter of which is such as to be a sliding fit on the segment 30. An inwardly extending projection 36 protrudes from the surface of the bore 34 into sliding abutment with the reduced diameter segment 32 of the shaft 18. When the mirror carrier 16 is in the orientation shown in FIG. 2, the abutment 36 is in contact with a step 38 at one junction between the two segments 30 and 32 of the shaft 18. When the mirror carrier 16 is pivoted to the position shown in FIG. 3, the projection 36 is in contact with another step 40 between the other ends of the two segments 30 and 32 of the shaft 18, as shown in FIG. 5. When the mirror carrier 16 is in an intermediate position between the two orientations illustrated in FIGS. 2 and 3, the projection 36 is midway between the two steps 38 and 40, as illustrated in FIG. 6.

FIGS. 7 to 10 illustrate a second embodiment of the invention having two mirror carriers 50 and 52 both mounted in a housing similar to that shown in FIG. 1 and journalled on respective mutually parallel shafts 54 and 56. The mirror carrier 50 has a substantially plane mirror 58 on one side and a rather more convex cylindrical mirror 60 on the other. One end 62 of the mirror carrier 50 is of convex cylindrical shape, while the other end 64 is concave. The other mirror carrier 52 has a substantially plane mirror 66 on one face and a convex cylindrical mirror 68 on the other. Its ends 70 and 72 are both of convex cylindrical shape, similar to the ends 20 and 22 of the mirror carrier 16 of FIGS. 2 and 3.

Figure 8:
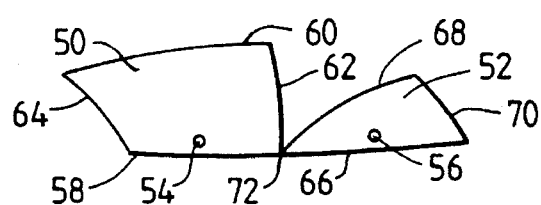
FIG. 8 is a plan view of the mirror carriers shown in FIG. 7.
Figure 9:
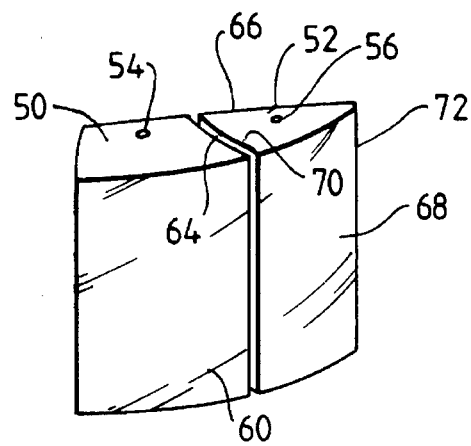
FIG. 9 is a perspective view of the embodiment shown in FIG. 8, but with the mirror carriers oriented to provide a mirror with a zone of increased curvature.
Figure 10:
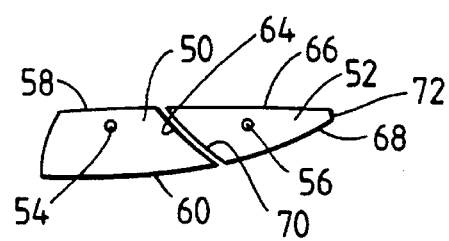
FIG. 10 is a plan view of the mirror carrier shown in FIG. 9.

When the two mirror carriers 50 and 52 are in the orientation shown in FIG. 8, with the end 72 of the mirror carrier 52 adjacent to convex end 62 of the mirror carrier 50, the two substantially plane mirrors 58 and 66 together form a substantially continuous plane reflective surface. On the other hand, when the two mirror carriers 50 and 52 are in the orientation illustrated in FIGS. 9 and 10, with the end 70 of the mirror carrier 52 adjacent to the concave end 64 of the mirror carrier 50, the two convex cylindrical mirrors 60 and 68 together provide a continuous reflective surface of increasing convexity towards the right of the assembly as viewed in the drawings.

Figure 11:
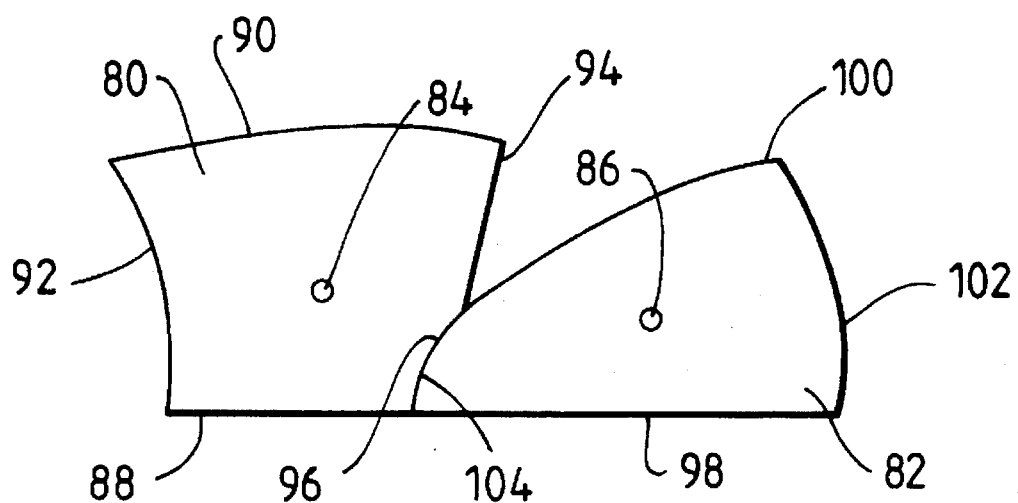
FIG. 11 is a plan view of a third embodiment of the invention, in which both mirror carriers are mounted for angular movement, and are oriented to provide a substantially plane mirror.
Figure 12:
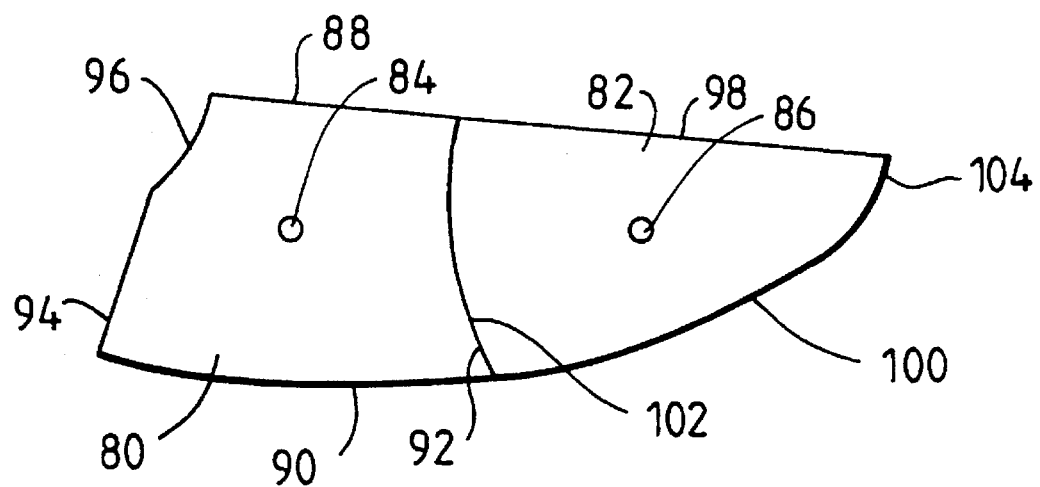
FIG. 12 is a plan view of the embodiment shown in FIG. 11, but with the mirror carriers oriented to provide a mirror with a zone of increased curvature in two mutually perpendicular directions.

FIGS. 11 and 12 show a third embodiment of the invention having two mirror carriers 80 and 82 both mounted in a housing similar to that shown in FIG. 1 and journalled on respective mutually parallel shafts 84 and 86. The mirror carrier 84 has a substantially plane mirror 88 on one side and a rather more convex mirror 90 on the other. One end 92 of the mirror carrier 80 is of concave cylindrical shape, while the other end has a plane portion 94 and a concave portion 96. The other mirror carrier 82 has a substantially plane mirror 98 on one face and a mirror 100 on the other which is convex both parallel and perpendicular to the shaft 86. Both ends 102 and 104 of the second mirror carrier 82 are of convex cylindrical shape. Because of the convex curvature of the mirror 100 in the direction perpendicular to the plane of FIGS. 1 and 12, the end 104 is thicker in its central region that at either end. In order to ensure that this thicker central region does not obstruct relative angular movement of the two mirror carriers 80 and 82, at least one of the shafts 84 and 86 is journalled in resilient bearings which bias the two shafts towards one another but allows them to move apart to a limited extent.

When the two mirror carriers 80 and 82 are in the orientation shown in FIG. 11, with the end 104 of the mirror carrier 82 adjacent to end 96 of the mirror carrier 80, the two substantially plane mirrors 88 and 98 together form a substantially continuous plane reflective surface. On the other hand, when the two mirror carriers 80 and 82 are in the orientation illustrated in FIGS. 12, with the end 102 of the mirror carrier 82 adjacent to the concave end 92 of the mirror carrier 80, the two convex mirrors 90 and 100 together provide a continuous reflective surface of increasing convexity towards the right of the assembly as viewed in the drawings.

I claim:

1. An exterior mirror assembly for a motor vehicle, comprising a housing containing a first mirror carrier having a first substantially plane mirror mounted thereon and a second mirror carrier mounted adjacent to the first mirror carrier for angular movement about an axis parallel to an adjacent edge of the first mirror, the second mirror carrier having a substantially plane mirror on a first face and a convex mirror of greater curvature than the substantially plane mirror on a second face so that, with the second mirror carrier in a first orientation, the mirror on the first face forms a substantially continuous reflective surface with the mirror on the first mirror carrier of substantially uniform curvature and, when the second mirror carrier is in a second orientation, the convex mirror on the second face forms a substantially continuous reflective surface with the mirror on the first mirror carrier of greater curvature in the region of the second mirror carrier than in the region of the first mirror carrier, wherein the first mirror carrier is also pivotally mounted for angular movement about an axis parallel to that of the second mirror carrier and has a second mirror on another face of radius of curvature greater than that of the mirror on its first face.

2. An exterior mirror assembly according to claim 1, wherein at least one of the mirror carriers has resilient mounting means biasing it towards the other mirror carrier but allowing the two mirror carriers to move apart to a limited extent.

3. An exterior mirror assembly for a motor vehicle comprising a housing containing a first mirror carrier having a first substantially plane mirror mounted thereon and a second mirror carrier mounted adjacent to the first mirror carrier for angular movement about an axis parallel to an adjacent edge of the first mirror, the second mirror carrier having a substantially plane mirror on a first face and a convex mirror of greater curvature than the substantially plane mirror on a second face so that, with the second mirror carrier in a first orientation, the mirror on the first face forms a substantially continuous reflective surface with the mirror on the first mirror carrier of substantially uniform curvature and, when the second mirror carrier is in a second orientation, the convex mirror on the second face forms a substantially continuous reflective surface with the mirror on the first mirror carrier of greater curvature in the region of the second mirror carrier than in the region of the first mirror carrier, wherein at least one of the mirror carriers has a pivot unit comprising a static shaft having a first segment of greater radius than a second segment, the mirror carrier having a cylindrical bore of radius such as to be a sliding fit on the first segment, together with a radially inwardly extending projection having an inner end positioned to be a sliding fit on the second segment.

4. An exterior mirror assembly according to claim 3, wherein said static shaft of said one of said mirror carriers has resilient mounting means biasing it towards the other mirror carrier but allowing the two mirror carriers to move apart to a limited extent.

5. An exterior mirror assembly according to claim 3, wherein the first mirror carrier is also pivotally mounted for angular movement about an axis parallel to that of the second mirror carrier and has a second mirror on another face of radius of curvature greater than that of the mirror on its first face.

* * * * *